United States Patent [19]
Singh et al.

[11] Patent Number: 5,902,009
[45] Date of Patent: May 11, 1999

[54] UNDERSEAT STORAGE BIN

[75] Inventors: Jaswant Singh, Auburn Hills; Thomas J. Susko, Eastpointe; Michael W. Moran, Highland; Michael S. Boyer, Farmington Hills, all of Mich.; Daniel M. Knight, Ballwin, Mo.; Carter Cannon, Southfield, Mich.

[73] Assignee: Chrysler Corporation, Auburn Hills, Mich.

[21] Appl. No.: 09/016,862

[22] Filed: Jan. 30, 1998

[51] Int. Cl.[6] ...................................................... B60N 3/00
[52] U.S. Cl. ................................ 297/188.1; 297/188.08; 296/37.15; 296/65.05
[58] Field of Search ........................ 297/188.08, 188.09, 297/188.1; 296/69, 37.15, 65.01, 65.05

[56] References Cited

U.S. PATENT DOCUMENTS

| | | |
|---|---|---|
| D. 309,059 | 7/1990 | Bledsoe . |
| D. 358,125 | 5/1995 | Jackson . |
| 2,214,042 | 9/1940 | Burdick ............................. 312/348.3 X |
| 2,268,637 | 1/1942 | Bernstein ......................... 312/348.3 X |
| 2,465,770 | 3/1949 | Volsk .................................. 296/37.15 |
| 3,099,482 | 7/1963 | Woodruff, Sr. ...................... 297/188.09 |
| 3,727,970 | 4/1973 | Delmage ................................ 296/69 X |
| 4,540,213 | 9/1985 | Herlitz et al. . |
| 4,717,202 | 1/1988 | Batchelder, III et al. ..... 297/188.09 X |
| 4,996,937 | 3/1991 | Niina et al. ..................... 297/188.09 X |
| 5,039,155 | 8/1991 | Suman et al. . |
| 5,056,849 | 10/1991 | Norris, Jr. et al. .................. 296/65.05 |
| 5,065,920 | 11/1991 | Amner . |
| 5,096,249 | 3/1992 | Hines . |
| 5,161,700 | 11/1992 | Stannis et al. . |
| 5,249,724 | 10/1993 | Green . |
| 5,558,386 | 9/1996 | Tilly et al. ............................ 296/65.05 |

FOREIGN PATENT DOCUMENTS 333267   9/1989   European Pat. Off. ............ 296/37.15

*Primary Examiner*—Peter R. Brown
*Assistant Examiner*—David E. Allred
*Attorney, Agent, or Firm*—Brooks & Kushman P.C.

[57] ABSTRACT

An underseat storage bin is used with a pivotable vehicle bench seat in a vehicle having a floor surface. The bench seat is pivotable between a horizontal seating position and an upright stowed position for providing access beneath the seat. The bench seat is supported on seat support members at opposing ends. The storage bin includes a blow-molded bin structure having first and second ends removably attachable to the seat support members. The bin structure includes a plurality of generally vertical compartment walls arranged to form a plurality of storage compartments. At least one of the storage compartments extends substantially the entire length of the bench seat for storing long items. The compartment walls form open bottoms therebetween, such that the vehicle floor surface forms the bottom of each storage compartment for supporting items stored in the storage bin.

13 Claims, 4 Drawing Sheets

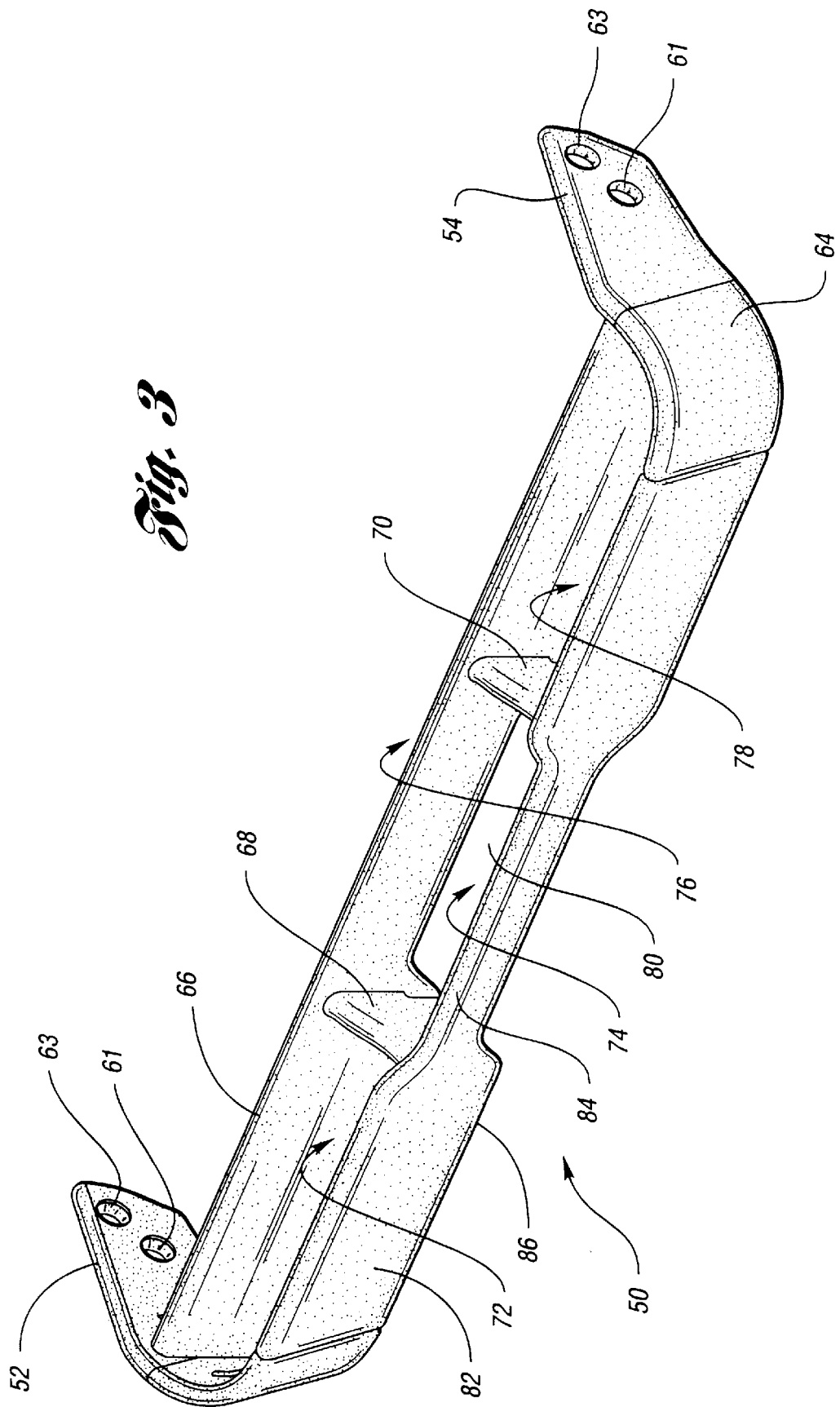

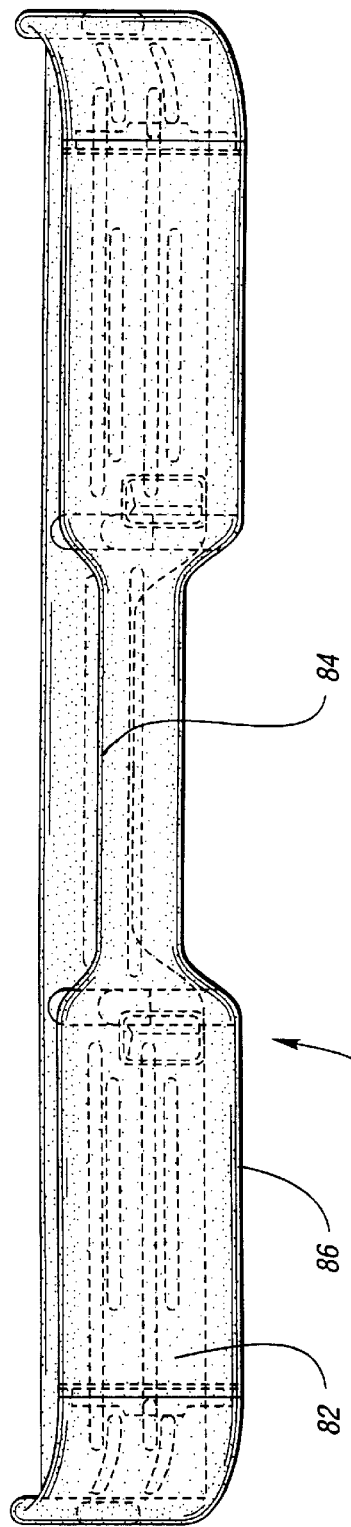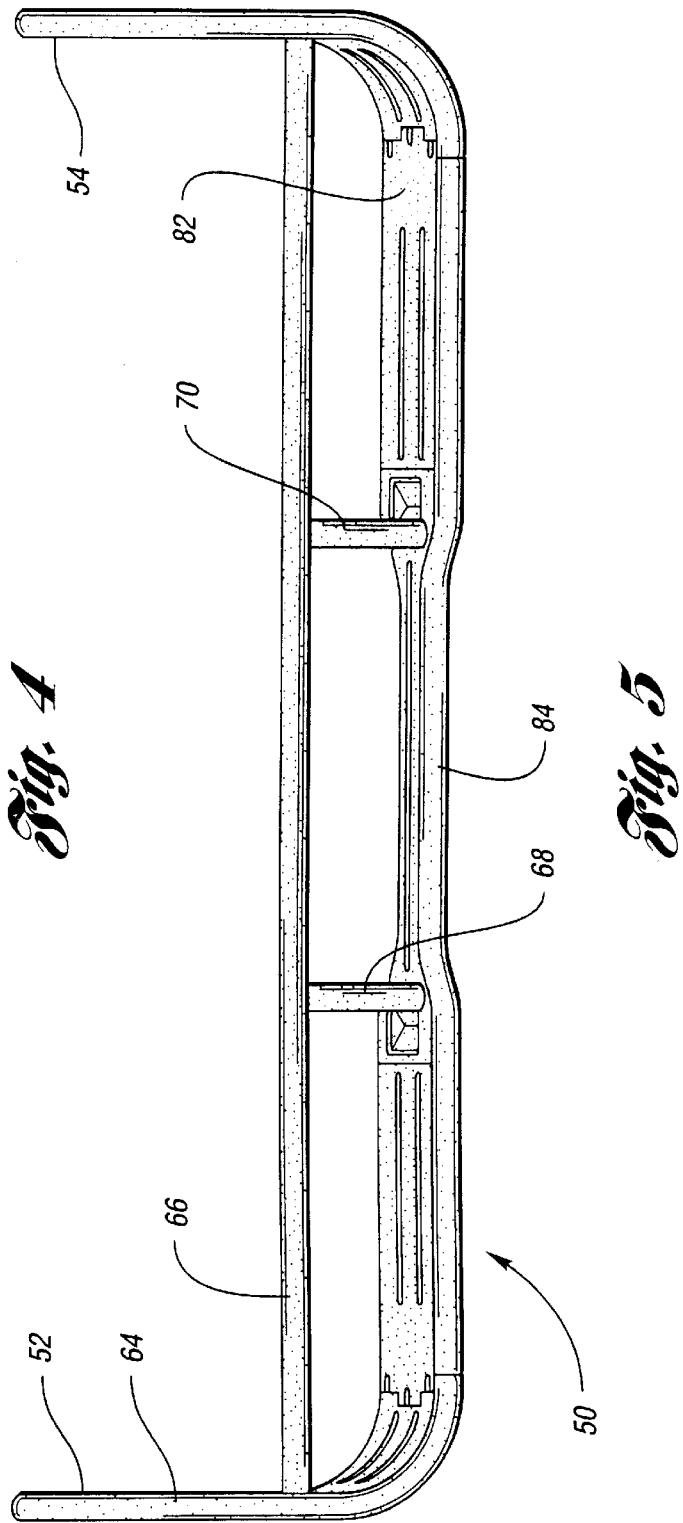

UNDERSEAT STORAGE BIN

TECHNICAL FIELD

The present invention relates to an underseat storage bin, and more particularly to an underseat storage bin which is attached to a foldable vehicle bench seat and which is bottomless such that items in the storage bin are supported on the vehicle floor.

BACKGROUND OF THE INVENTION

A need exists in vans, mini vans and extended cab pick-up trucks for out-of-sight storage space for such items as jumper cables, breakdown flares or reflectors, fire extinguishers, gloves, first-aid kits, flashlights, etc. Underseat storage trays are known, but generally, their storage capacity is limited and the accessibility of objects stored in the tray is poor.

Known underseat storage trays, generally, are not long enough to hold longer items such as umbrellas, fishing rods, gun cases, etc. Such storage trays are also typically not easily removable, which may limit available floor space when the seat is folded to an upright position.

Such storage trays are also problematic because a typical plastic or metal tray may create a vehicle rattle problem as flashlights or other hard objects bounce around the tray as the vehicle is driven. In addition, such trays are, generally, expensive to manufacture because they are typically metal or injection molded plastic components, and such trays add an additional manufacturing step at the assembly plant if the tray must be installed in the vehicle separately from the vehicle seat. For example, the tray may be mounted directly to the vehicle floor pan, which results in significant assembly costs.

It is, accordingly, desirable to provide an improved underseat storage bin.

DISCLOSURE OF THE INVENTION

The present invention overcomes the above-referenced shortcomings of the prior art under seat storage bins by providing an underseat storage bin which is removably attached to a foldable bench seat. The storage bin comprises a blow-molded structure with a plurality of generally vertical compartment walls forming a plurality of storage compartments, at least one of which extends substantially the length of the bench seat. The compartment walls form open bottoms therebetween such that the vehicle floor surface forms the bottom of each storage compartment for supporting items on the cushioned vehicle floor.

More specifically, the present invention provides an underseat storage bin for use with a pivotable vehicle bench seat in a vehicle having a floor surface. The bench seat is pivotable between a horizontal seating position and an upright position for providing access beneath the seat. The bench seat includes seat support members at opposing ends thereof. The storage bin includes a blow-molded bin structure having first and second ends removably attachable to the seat support members. The bin structure includes a plurality of generally vertical compartment walls arranged to form a plurality of storage compartments. At least one of the storage compartments extends substantially the entire length of the bench seat for storing long items. The compartment walls form open bottoms therebetween, such that the vehicle floor surface forms the bottom of each storage compartment for supporting items stored in the storage bin. The storage bin is designed to contain stored articles, even during abrupt stoppage and turning.

Preferably, a front wall (or front portion) of the bin structure is downwardly slanted rearward in the vehicle to provide heel space for seat occupants. Preferably, at least one of the storage compartments is formed along the front wall in a position accessible to the vehicle occupants without requiring raising of the bench seat to the upright position. Thumb wheel screws are provided at opposing ends of the pin structure for removably attaching the bin structure to the seat support members of the bench seat.

Accordingly, an object of the present invention is to provide an underseat storage bin which is installed in a vehicle with a foldable bench seat, and wherein the underseat storage bin is easily removable from the bench seat.

Another object of the invention is to provide an underseat storage bin, an open bottom such that the cushioned vehicle floor surface forms the bottom of each storage compartment for supporting items stored in the storage bin, thereby eliminating rattle.

A further object of the invention is to provide an underseat storage bin including a storage compartment configured to store items substantially as long as the bench seat.

Yet another object is to provide an underseat storage bin which is recessed to eliminate interference with occupant ingress and egress and to provide heel clearance for seat occupants.

The above objects and other objects, features and advantages of the present invention are readily apparent from the following detailed description of the best modes for carrying out the invention when taken in connection with the accompanying drawings.

BRIEF DESCRIPTION OF THE DRAWINGS

FIG. 3 shows a perspective view of an alternative preferred embodiment of an underseat storage bin;

FIG. 4 shows a front view of the underseat storage bin of FIG. 3;

FIG. 5 shows a top plan view of the underseat storage bin of FIG. 3;

DETAILED DESCRIPTION OF THE PREFERRED EMBODIMENTS

Figure 1:
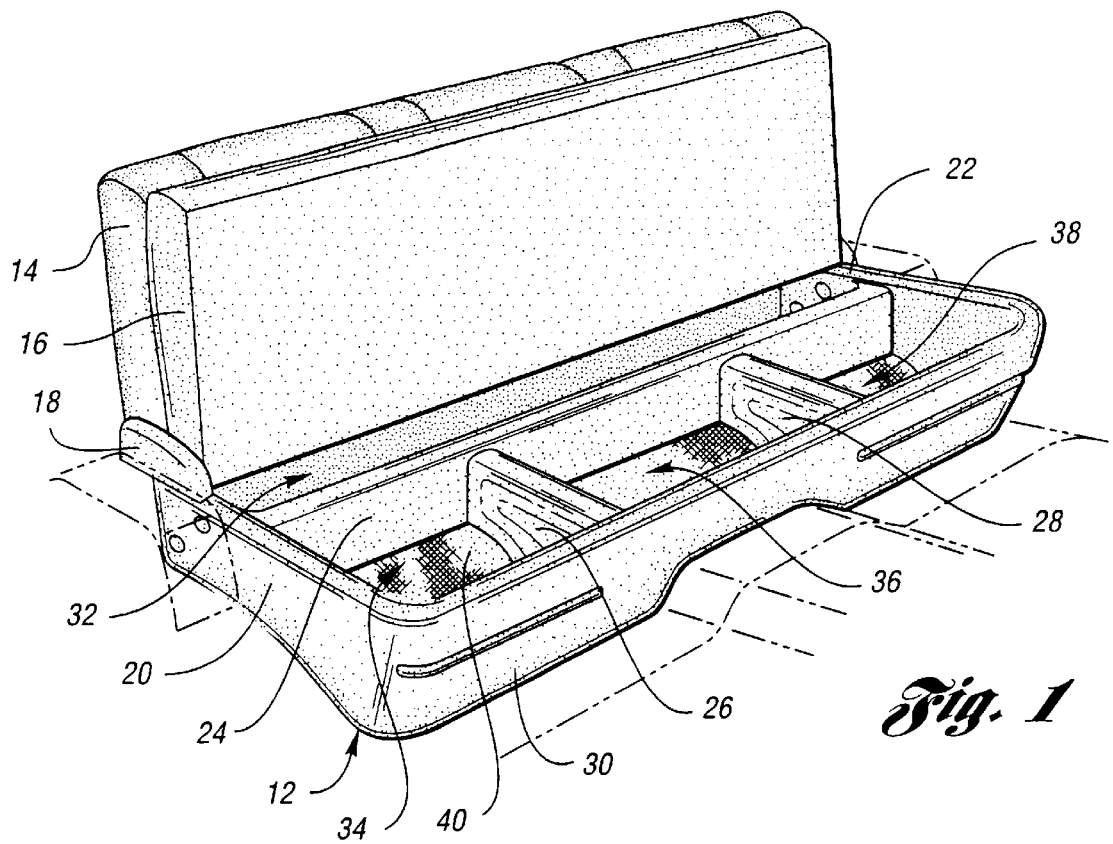
FIG. 1 shows a perspective view of a vehicle seat assembly including an underseat storage bin in accordance with an embodiment of the present invention, with the bench seat in the upright position.
Figure 2:
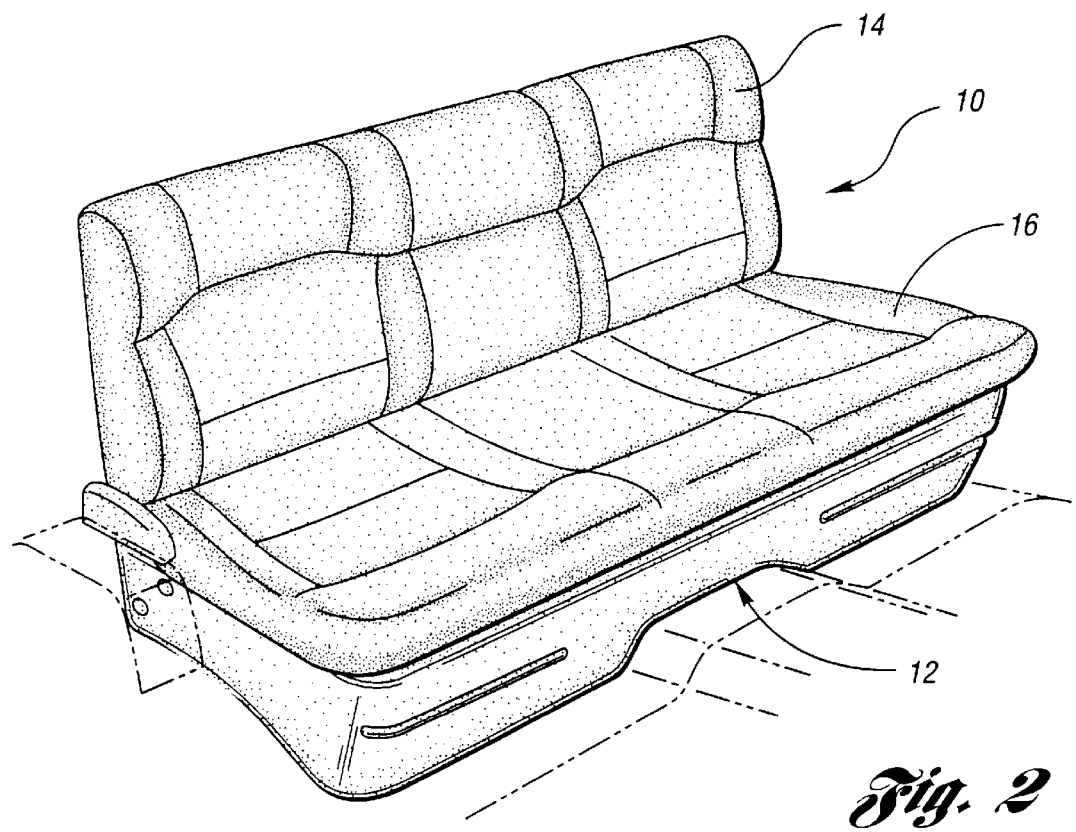
FIG. 2 shows a perspective view of the seat assembly of FIG. 1 with the bench seat in the seating position.

FIGS. 1 and 2 show perspective views of a vehicle seat assembly 10 incorporating an underseat storage bin 12 in accordance with a first embodiment of the invention. As shown, the vehicle seat assembly 10 includes a seat back 14 and a bench seat 16 which is pivotable between a horizontal seating position, as shown in FIG. 2, and an upright position, as shown in FIG. 1, for providing access beneath the bench seat 16. As shown in FIG. 1, the bench seat includes a seat support member 18 at opposing ends.

As shown in FIG. 1, the underseat storage bin 12 comprises a blow-molded bin structure having first and second ends 20,22 removably attached to the seat support members 18 at the opposing ends of the bench seat 16. The bin structure includes a plurality of generally vertical compartment walls 24, 26, 28, 30 arranged to form storage compartments 32, 34, 36, 38. As shown, storage compartment 32 extends substantially the entire length of the bench seat 16 for storing long items such as fishing poles, umbrellas, gun cases, etc.

The compartment walls 24, 26, 28, 30 form open bottoms therebetween, such that the carpeted vehicle floor surface 40 forms the bottom of each storage compartment 32, 34, 36, 38 for supporting items stored in the compartments. Because the vehicle floor 40 is generally cushioned or carpeted, rattle is eliminated between the storage components and the vehicle body.

Figure 6:
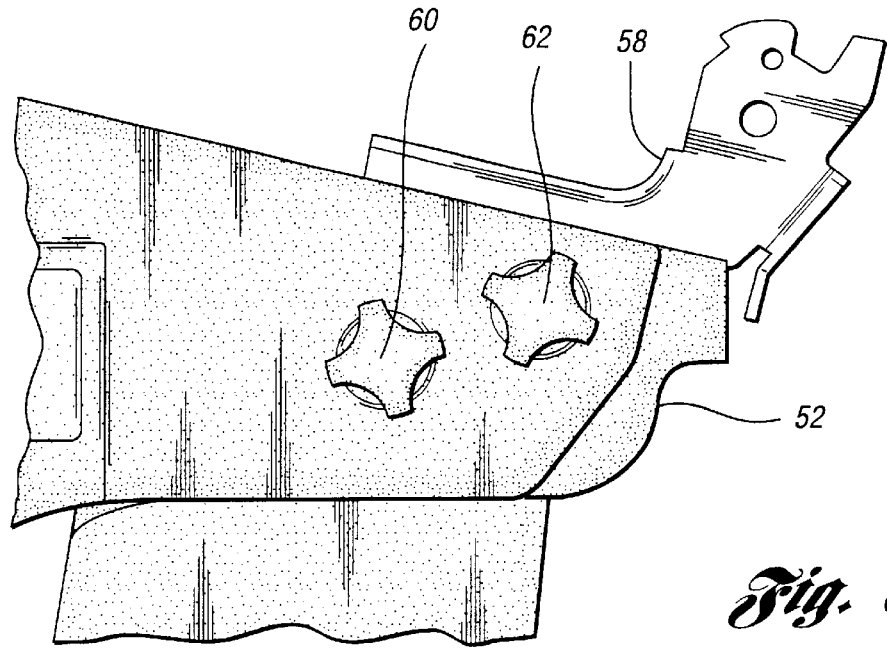
FIG. 6 shows a cut-away view of an underseat storage bin attached to a vehicle seat in accordance with the embodiment of FIG. 3.
Figure 7:
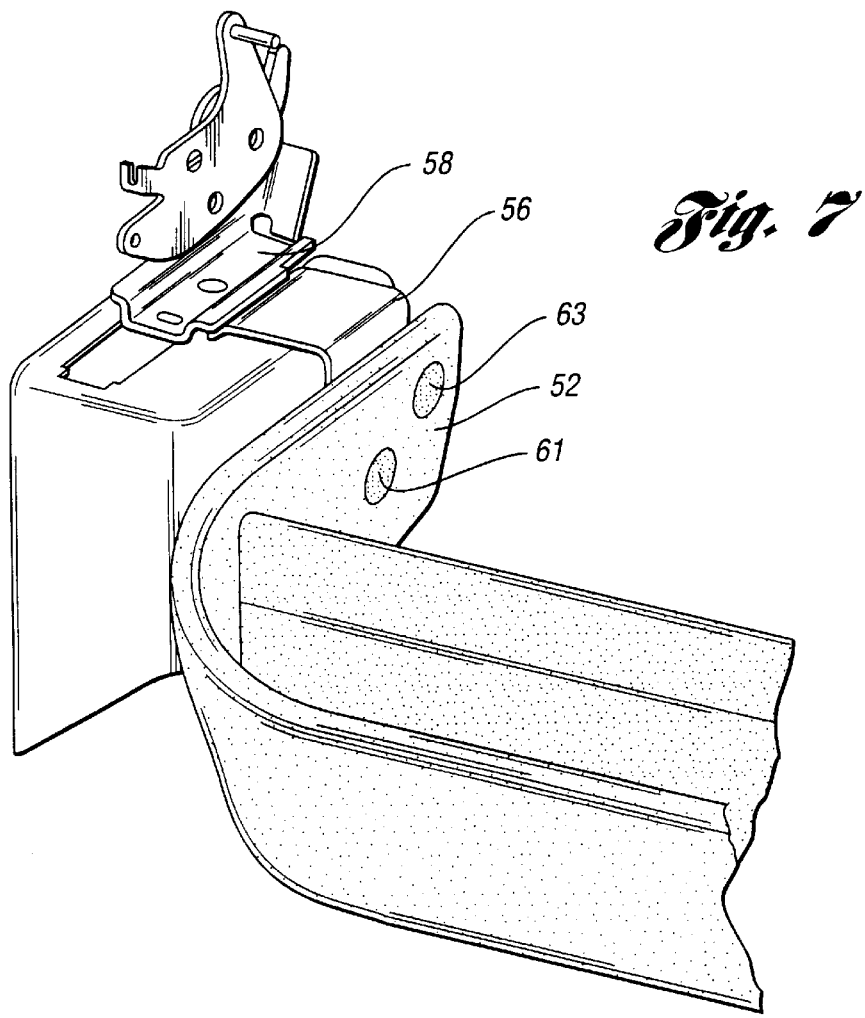
FIG. 7 shows a front perspective view of the underseat storage bin and vehicle seat assembly attachment illustrated in FIG. 6.

A preferred embodiment of an underseat storage bin 50 is illustrated in FIGS. 3–7. As shown, the storage bin 50 is a blow-molded structure having first and second ends 52,54 attachable to bin mounting brackets 56 attached to seat support members 58 at opposing ends of the seat as illustrated in FIG. 7. Screws placed through the apertures 61,63 attach the first and second ends 52,54 to the bin mounting brackets 56 for easy attachment therefrom for removal of the storage bin 50 from beneath the seat. Alternatively, hex-head screws or thumb wheel screws 60,62 may be used for ease of detachment, as shown in FIG. 6.

The bin structure 50 includes a plurality of generally vertical compartment walls 64, 66, 68, 70 arranged to form the storage compartments 72, 74, 76, 78. Compartment 76 extends substantially the entire length of the bench seat for storing longer items.

As shown, the compartment walls 64, 66, 68, 70 form open bottoms therebetween, such that the vehicle floor 80, which is generally carpeted or padded, will form the bottom of each storage compartment 72, 74, 76, 78 for supporting items stored in the bin 50.

The outer compartment wall 64 is a generally C-shaped structure, as shown in FIG. 5, with walls 66, 68, 70 attached thereto. The C-shaped outer wall 64 includes a front portion 82 which is downwardly slanted rearward in the vehicle to provide heel space for seat occupants.

The top edge 84 of the outer wall 64 is recessed slightly such that storage compartment 74 may be accessible to vehicle occupants without requiring raising of the bench seat to the upright position for access. In particular, the front center compartment 74 is configured to be accessible to the vehicle driver when seated at the steering wheel. Compartments 72 and 78 may also be accessible to rear seat occupants with the bench seat in the seating position. Preferably, a designed interference of 3 millimeters with the floor carpet is provided between the lower edge 86 of the bin structure 50 and the carpeted floor of the vehicle.

The storage bin 50 will be attached to, and installed with, the bench seat, thereby eliminating assembly steps and reducing floor space required at a vehicle assembly plant.

The bin structure is, preferably, blow-molded of 30 percent mica filled polypropylene, and the various components are riveted or screwed together. The front wall 82 of the bin 50 is designed to sustain 150 pounds vertical load spread across two hand grip lengths.

While the best modes for carrying out the invention have been described in detail, those familiar with the art to which this invention relates will recognize various alternative designs and embodiments for practicing the invention within the scope of the appended claims.

What is claimed is:

1. An underseat storage bin and a pivotable vehicle bench seat for a vehicle having a floor surface, the bench seat being pivotable between a horizontal seating position and an upright position for providing access beneath the seat, and the bench seat having seat support members at opposing longitudinal ends of the bench seat, the storage bin comprising:

a unitary blow-molded bin structure having first and second ends removably attached to the seat support members, said bin structure including a plurality of generally vertical compartment walls forming a plurality of storage compartments, at least one of said storage compartments extending substantially the entire length of the bench seat for storing long items;

wherein said compartment walls form open bottoms therebetween, such that the vehicle floor surface forms the bottom of each said storage compartment for supporting items stored in the storage bin.

2. The underseat storage bin of claim 1, wherein said bin structure comprises a generally C-shaped outer wall with said compartment walls connected to the outer wall.

3. The underseat storage bin of claim 2, wherein said generally C-shaped outer wall comprises a front portion which is slanted rearwardly and downwardly relative to said vehicle to provide heel space for seat occupants.

4. The underseat storage bin of claim 3, wherein at least one of said storage compartments is formed along said front portion in a position accessible to vehicle occupants through a recess in a top edge of said outer wall without requiring raising of the bench seat to the upright position.

5. The underseat storage bin of claim 4, further comprising thumb wheel screws at said first and second ends for removably attaching the bin structure to the seat support members.

6. The underseat storage bin of claim 5, further comprising first and second mounting brackets attached to the seat support members and receiving the thumb wheel screws.

7. A vehicle seat assembly for use in a vehicle having a cushioned floor surface, the seat assembly comprising:

a vehicle bench seat pivotable between a horizontal seating position and an upright stowed position for providing access beneath the seat, the bench seat having seat support members at opposing longitudinal ends of the bench seat; and a unitary blow-molded bin structure having first and second ends removably attached to the seat support members, said bin structure including a plurality of generally vertical compartment walls forming a plurality of storage compartments, at least one of said storage compartments extending substantially the entire length of the bench seat for storing long items;

wherein said compartment walls form open bottoms therebetween, such that the vehicle floor surface forms the bottom of each said storage compartment for supporting items stored in the storage bin, thereby eliminating potential rattle conditions in the vehicle.

8. The vehicle seat assembly of claim 7, wherein said bin structure comprises a generally C-shaped outer wall with said compartment walls connected to the outer wall.

9. The vehicle seat assembly of claim 8, wherein said generally C-shaped outer wall comprises a front portion which is slanted rearwardly and downwardly relative to said vehicle to provide heel space for seat occupants.

10. The vehicle seat assembly of claim 9, wherein at least one of said storage compartments is formed along said front portion in a position accessible to vehicle occupants through a recess in a top edge of said wall without requiring raising of the bench seat to the upright position.

11. The vehicle seat assembly of claim 10, further comprising thumb wheel screws at said first and second ends for removably attaching the bin structure to the seat support members.

12. The vehicle seat assembly of claim 11, further comprising first and second mounting brackets attached to the seat support members and receiving the thumb wheel screws.

13. An underseat storage bin and a pivotable vehicle bench seat for a vehicle having a floor surface, the bench seat being pivotable between a horizontal seating position and an upright position for providing access beneath the seat, and the bench seat having seat support members at opposing longitudinal ends of the bench seat, the storage bin comprising:

a unitary blow-molded bin structure having first and second ends removably attached to the seat support members, said bin structure including a plurality of generally vertical compartment walls forming a plurality of storage compartments, at least one of said storage compartments extending substantially the entire length of the bench seat for storing long items;

wherein said compartment walls form open bottoms therebetween, such that the vehicle floor surface forms the bottom of each said storage compartment for supporting items stored in the storage bin; and wherein said bin structure comprises a generally C-shaped outer wall with said compartment walls connected to the outer wall, said generally C-shaped outer wall including a front portion which is slanted rearwardly and downwardly relative to the vehicle to provide heel space for seat occupants.

* * * * *

UNITED STATES PATENT AND TRADEMARK OFFICE
CERTIFICATE OF CORRECTION

PATENT NO. : 5,902,009
DATED : May 11, 1999
INVENTOR(S) : Jaswant Singh et al.

It is certified that error appears in the above-identified patent and that said Letters Patent is hereby corrected as shown below:

On the title page add the following

--[73]  Lear Corporation, Southfield, Michigan   --

Signed and Sealed this

Twenty-ninth Day of February, 2000

Attest:

Q. TODD DICKINSON

*Attesting Officer*   *Commissioner of Patents and Trademarks*